Feb. 26, 1952 R. WIDMER 2,587,560
SPRING ACTUATED LOCK NUT
Filed April 19, 1946 3 Sheets-Sheet 2

INVENTOR
RENE WIDMER
By
Attys.

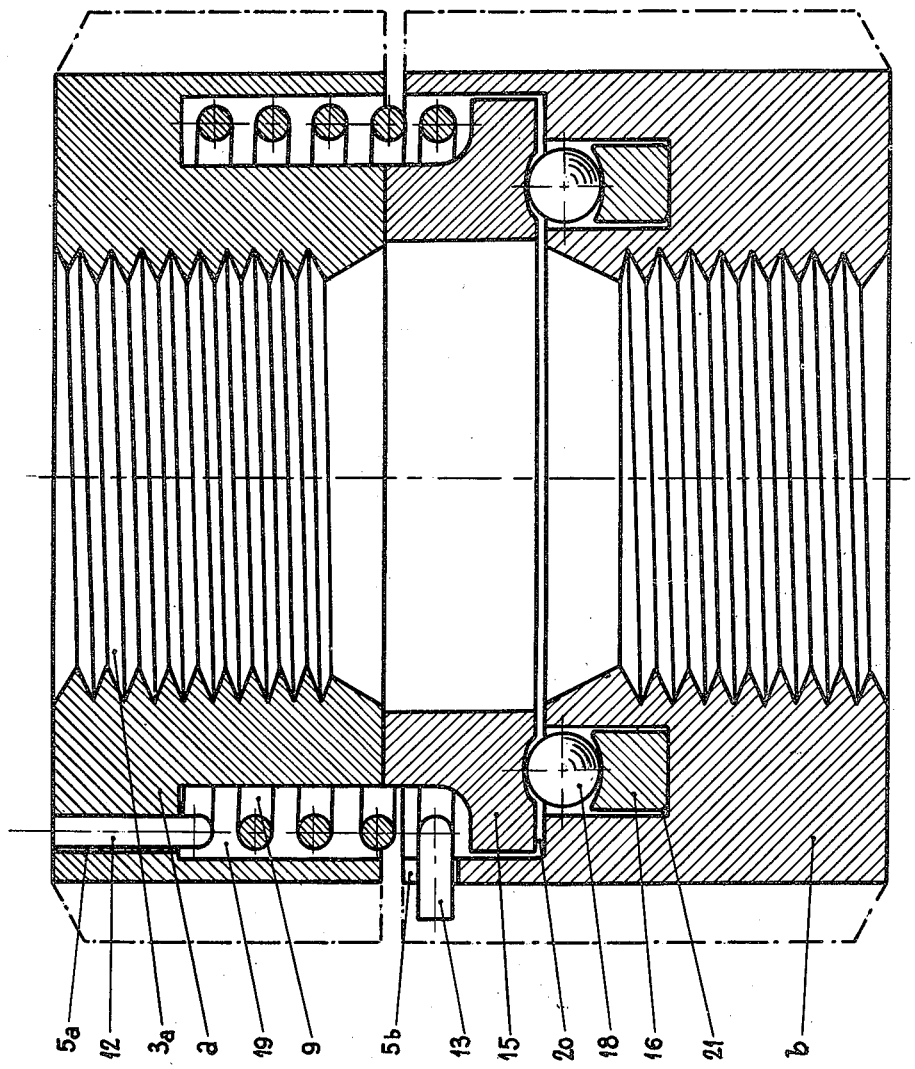

Patented Feb. 26, 1952

2,587,560

UNITED STATES PATENT OFFICE 2,587,560

SPRING ACTUATED LOCK NUT

René Widmer, Geneva, Switzerland

Application April 19, 1946, Serial No. 663,353
In Switzerland May 25, 1945

3 Claims. (Cl. 151—15)

There exists a great number of so-called self-locking nuts, to be screwed on a bolt or screw or more generally stated on a threaded rod; but none of them gives entire satisfaction. Some of them while correctly functioning are too costly to permit of their generalised use, others do not allow for an efficient tightening because their construction is based on a local reduction of the cross section of the nut used as compared to the usual nut, others still are too difficult to assemble and lastly others do not allow for their repeated tightening and loosening.

The present invention has for its object a safety self-locking device to be screwed on a threaded rod, comprising two nuts provided each with a circular recess on the frontal faces opposite to one another and adapted to receive an elastic connecting member. This device tends to avoid the inconveniences of similar known devices of this kind owing to the fact that the elastic connecting member consists in a coil spring whose ends are attached respectively to one or the other of these nuts in order to exert on them a torque tending, in cooperation with the thread on the rod, to screw them against each other on this rod.

The annexed drawing shows schematically and by way of example a form of the device, object of the invention.

Fig. 4 shows another form at a larger scale.

Figure 1:
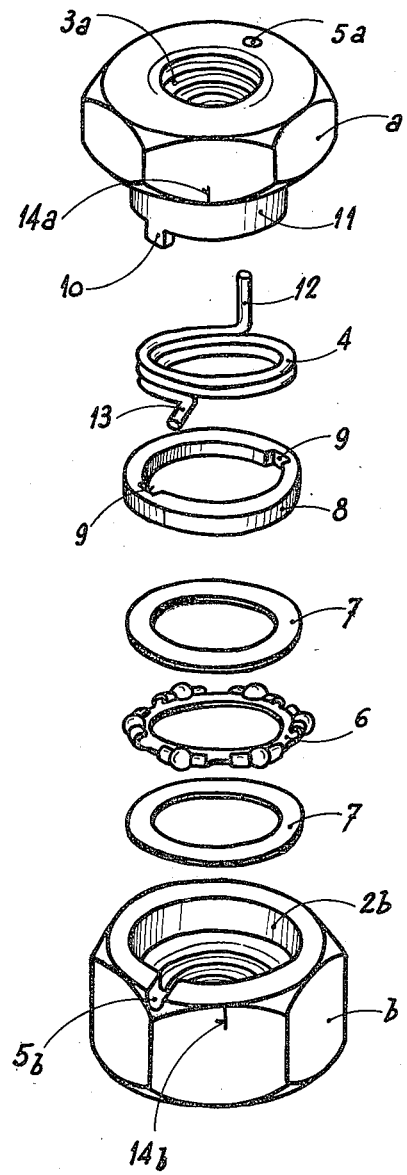
Fig. 1 is a perspective view, the various constituent elements being separated from one another for more clearness.

In the form shown on the drawing, the safety device object of the invention comprises two nuts $a$ and $b$. Each nut $a$, $b$ is provided on its frontal face facing the other nut with a circular recess adapted to receive connecting members, mechanically connecting the two nuts with one another. The nut $a$ has an annular groove $2a$ concentric with the thread $3a$ and adapted to receive a coil spring 4. A hole $5a$ drilled parallelly with the axis of the thread connects with the bottom of said groove. This hole is adapted to house one of the ends of the spring 4.

The second nut $b$ has an annular recess $2b$ and a radial groove $5b$. The latter is adapted to house the second end of the spring 4. In the recess is mounted a thrust ball bearing made up of a set of balls 6 and two washers of hardened steel. Lastly the upper washer 7 is topped with a ring 8 provided with two slots 9 adapted to receive prongs 10 made integral with a collar or annular wall 11 of the nut $a$.

One of the ends 12 of the spring 4 is bent parallelly with the winding axis of the latter in order that this end may be engaged in the hole $5a$. The other end 13 of the spring 4 is turned in radially so as to become engaged in the groove $5b$.

Each nut bears on its periphery a reference mark $14a$, $14b$ respectively, corresponding to the relative angular position of the nuts for which the threading in one constitutes the exact continuation of the threading in the other when these nuts are placed coaxially one on top of the other. Lastly when the nuts are placed coaxially one on top of the other with the reference marks facing each other, the relative angular positions of the hole $5a$ and of the groove $5b$ do not correspond to the relative angular positions of the ends of the spring 4 in its free state. This hole and this groove are located in such relative positions with respect to the relative angular positions of the ends of the spring in its free state that after assembling the nuts on a bolt 1 with their frontal faces in contact, the spring tends to screw the two nuts against each other on this bolt.

In order to keep together all of the constituent elements of the device described, the ends of the spring may be fastened with the respective nut. In the form represented, only one of the ends of the spring is secured to the nut $a$ by means of a soldered point 15. It is evident that the ends of the spring may be secured with their respective nut by any known means without departing from the spirit and scope of the invention.

The device described operates as follows:

The two nuts are screwed on a bolt after placing the reference marks $14a$, $14b$ facing each other in order that the threading in the nut $a$ is the exact continuation of the threading in the nut $b$. Then, the nut $b$ is tightened with a spanner and the nut $a$ is automatically driven in rotation by the spring 4 which tends to maintain always the two nuts in contact. The two nuts could be tightened together also by means of a socket wrench. After tightening nut $b$, the whole is locked by tightening the nut $a$ which constitutes a jamb-nut.

The device is thus in place and cannot become loose under the influence of shocks or vibrations because the springs 4 always tends to screw the nuts $a$ and $b$ against each other and thus to lock the nuts with respect to one another. In fact, the nut $b$ when being unscrewed alone cannot take with it in its movement the nut $a$, because the frictional forces produced in the ball thrust bearing are proportionately small and smaller than the frictional forces exerted by the threads of the nut $a$ on the threads of the bolt or threaded rod 1.

From the above, one may see that the described device is exceedingly simple and efficient.

Further, it is easy to mount no special tool nor special manual skill being necessary neither for assembling it on a bolt nor for tightening it. Further this device permits of an unlimited number of tightening and loosening operations because no gripping or jamming effort must be overcome during loosening. In fact, in order to loosen the device, it is sufficient to unscrew the nut $a$ by means of a wrench until both reference marks 14a and 14b face on another, and then unscrew simultaneously both nuts thus liberated from each other.

If the nut $b$ is to function as a usual tightening nut and the nut $a$ as a jamb-nut, the latter is shallower than nut $b$ so that its mass is less also. In this case, the device described affords still the great advantage of avoiding the loss of screws placed without being tightened on a bolt subjected to vibrations. In fact, in the case where the vibrations are such that they tend to loosen the nut $b$ with respect to the part to be clamped, the inertia torque of the nut $b$ being greater than that of the nut $a$, the nut $b$ shall become locked against the nut $a$ (relative velocity of the nut $b$ with respect to the bolt greater than that of the nut $a$). In the case of vibrations causing accelerations in the opposite direction, the nut $b$ shall become locked against the piece to be clamped, then the nut $a$ will become locked against the nut $b$. The security afforded is thus complete.

The thrust ball bearing provided in the form described above for avoiding sliding frictional faces between the frontal faces of the nuts may be replaced by any other known device or member. The steel washers on either side of the thrust balls could be also eliminated provided that some precautions be taken to avoid the indentation of the metal by the balls under the action of the high pressure to which the latter are subjected when the nuts are pulled tight. The ring could also be omitted under the condition that a good resting surface be provided for the thrust balls.

Lastly, in the case of hardened steel nuts for instance, the frontal faces of the nuts coming in contact could be polished in order to reduce the frictional forces between them to a value smaller than the frictional forces exerted by one of the nuts on the threads of the bolt and thus avoid the driving in rotation of one of the nuts by the other one.

According to the form represented on Fig. 4 the safety device comprises in principle the same elements and main organs as those described above, but with slightly different shapes.

The nut $a$ has a circular recess 19 in which is mounted the spring 9. One end 12 of the ends of the latter is bent and engaged in a hole 5a. The second nut $b$ has a circular groove 21 leading to a circular recess 20. The wall of the latter has a groove 5b with which is engaged the second bent end 13 of the spring 9.

In the recess 21 is located a ball race 16 of treated steel on which may roll the balls 18. In the recess 20 is placed a ball race 15 in contact on one hand with the balls 18 and on the other hand with the frontal face of the nut $a$. The ball race 15 is so shaped that it may be kept in position by the spring 9, this avoiding the dismantling of the ball bearing during the handling of the device.

Figure 2:
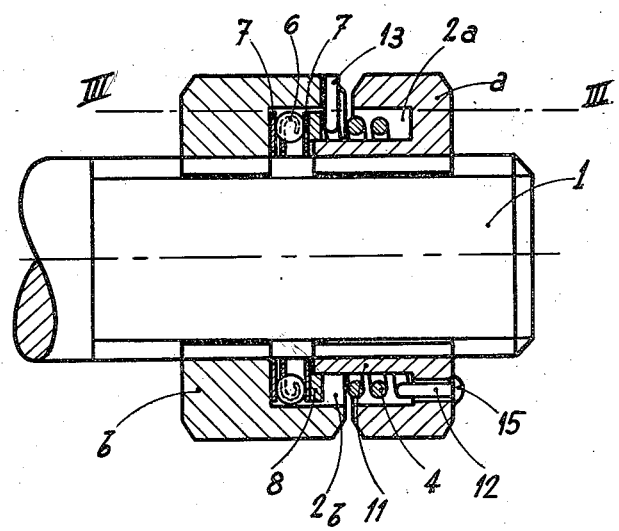
Fig. 2 is a view of an axial section of the device mounted on a bolt.
Figure 3:
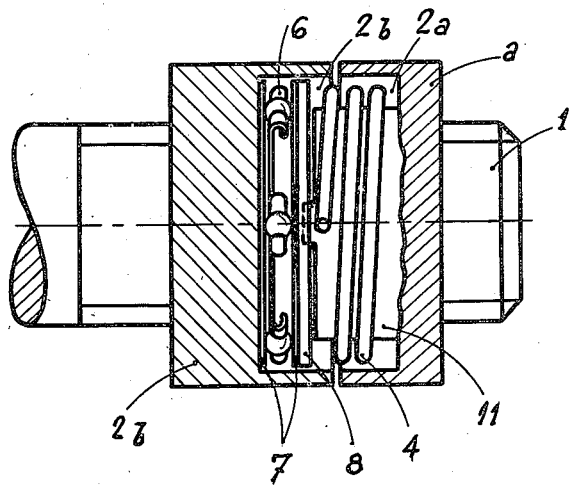
Fig. 3 is a view of a section along line III—III of Fig. 2.

The functioning of the device shown on Fig. 4 is in every point similar to that of the device represented on Figs. 2 and 3.

The device represented on Fig. 4 has the advantage of including ball races for the balls 8 of a thickness sufficient to avoid the deformation of the latter under the influence of the large strains to which they may be subjected.

In order to obtain a perfect functioning of the device described, it is advantageous that the torque exerted by the spring tending to screw the nuts $a$ and $b$ one against the other be larger than the frictional torque exerted by the nut $a$ on the thread of the bolt.

The torque of the spring is chosen also superior to the maxifum torque, due to inertia forces generated in the nut $a$ when the latter is subjected to vibrations.

I claim:

1. A safety self-locking device for engagement with a threaded rod and comprising a pair of nuts, the first nut having an annular recess and including an annular wall between the recess and threaded bore and projecting beyond the remaining surface confronting the other nut, a coil spring in the recess and including several turns and anchored at its ends in the nuts and urging them together, an anti-friction bearing on the other nut and including a ring non-rotatably engaged by the outer end of the wall and keeping the remaining confronting surfaces of the nuts apart.

2. A safety self-locking device for engagement with a threaded rod and comprising a pair of nuts, the first nut having an annular recess and including an annular wall between the recess and threaded bore and projecting beyond the remaining surface confronting the other nut, a coil spring in the recess and including several turns and anchored at its ends in the nuts, prongs on the outer end of the wall, an anti-friction bearing on the other nut and including a ring with slots each receiving a prong and rendering the ring rotatable with the wall, the bearing when engaged keeping the remaining confronting surfaces of the nuts apart.

3. A safety self-locking device for engagement with a threaded bolt and comprising a pair of nuts of equal contours permitting the application of equal couples thereto, the first nut having an annular recess and including an annular wall between the recess and threaded bore and projecting beyond the remaining surface confronting the other nut, a coil spring in the recess and including several turns and anchored at its ends in the nuts, and an anti-friction bearing on the other nut and engaged by the first nut under stress of the spring, said spring being still stressed when both nuts engage the bearing.

RENÉ WIDMER.

REFERENCES CITED

The following references are of record in the file of this patent:

UNITED STATES PATENTS

| Number | Name | Date |
|---|---|---|
| 676,939 | Eveland | June 25, 1901 |
| 1,216,954 | Crowley | Feb. 20, 1917 |
| 2,301,634 | Nicholay | Nov. 10, 1942 |

FOREIGN PATENTS

| Number | Country | Date |
|---|---|---|
| 107,851 | Great Britain | July 19, 1917 |
| 209,896 | Switzerland | Aug. 1, 1940 |
| 427,809 | France | Aug. 14, 1911 |